United States Patent Office 3,522,522
Patented Aug. 4, 1970

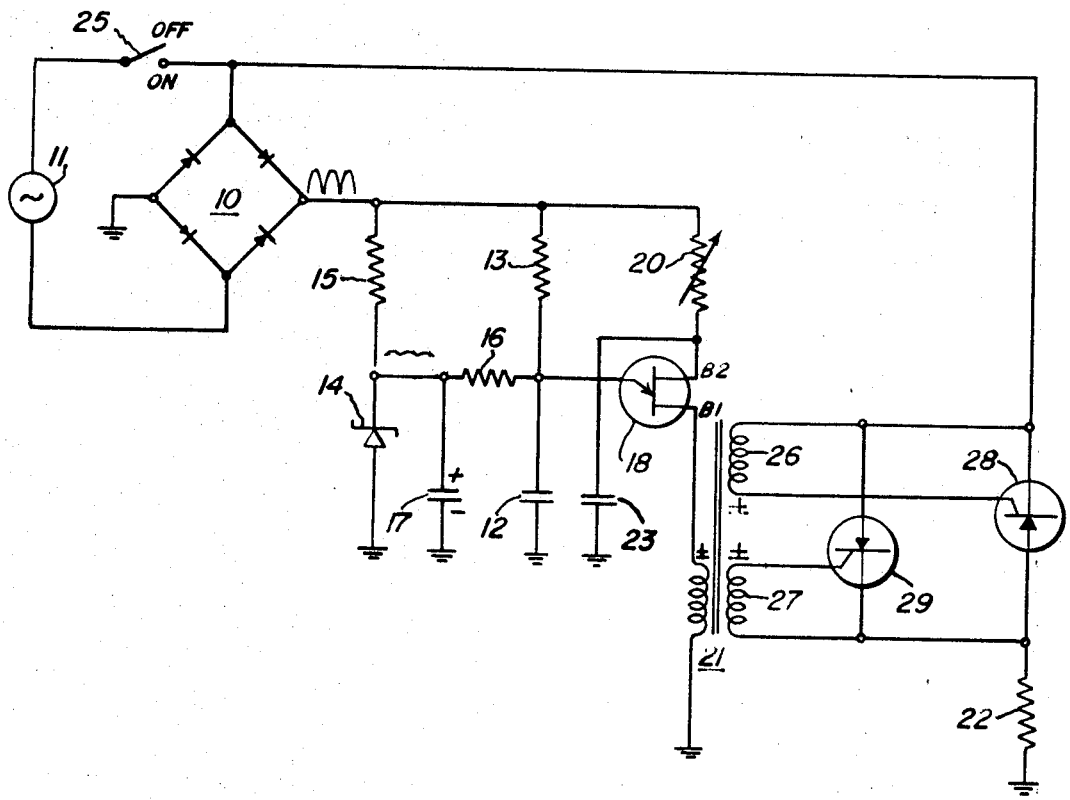

1

3,522,522
DUAL CHARGING OF A CAPACITOR TO PRODUCE A CONSTANT A.C. VOLTAGE
Jerome J. Tiemann, Schenectady, N.Y., assignor to General Electric Company, a corporation of New York
Filed Feb. 15, 1968, Ser. No. 705,721
Int. Cl. G05f 3/04
U.S. Cl. 323—22                                    3 Claims

ABSTRACT OF THE DISCLOSURE

A power control circuit for delivering to a load substantially constant RMS voltage over a wide range of AC input voltages by controlling, in each half cycle of input voltage, the time at which the load is energized. This is accomplished by applying to the emitter of a unijunction transistor a voltage from a capacitor which is charged jointly from the input voltage after full-wave rectification and from a substantially constant DC voltage, and utilizing the voltage pulses produced by the unijunction transistor to trigger a controlled rectifier.

INTRODUCTION

This invention relates to power control circuits, and more particularly to circuits for controlling precisely, at a constant level, the amplitude of root mean square voltage supplied to a load from a source of AC power.

Due to differences in amplitude of commercial AC voltage from country to country, it is often necessary to employ apparatus such as step-down transformers in order to operate electrical apparatus in a country other than the one in which it has been purchased. However, for people who travel frequently from one country to another, either a different transformer must be employed each time a journey is made between countries having different commercial AC voltage amplitudes, or different taps must be utilized on the same transformer taken along on each journey. This presents an onerous situation, since the wrong value of voltage applied to a load often results in costly damage thereto. The desirability of apparatus to replace such transformer, without any requirement for tap changing, is manifest.

The present invention concerns a circuit for replacing a step-down transformer, wherein tap changing is unnecessary; all that is required is to connect the input of the circuit to the commercial AC line and the output of the circuit to the load, regardless of the amplitude of AC line voltage, provided only that the amplitude of line voltage be at least equal to the rated voltage of the load. The circuit thus supplies to the load a substantially constant root mean square, or RMS, voltage amplitude from an alternating current source of voltage amplitude falling within a wide range of values. In fact, the circuit of the present invention can maintain a constant RMS output voltage amplitude over a range of variation in RMS input voltage amplitudes of nearly a factor of 10. The circuit, which is conveniently simple in configuration and compact in size, therefore finds additional utility in voltage regulator applications, especially those applications wherein the input voltage, for example, is up to several times the RMS voltage amplitude for which the load is rated. By maintaining a constant RMS voltage across the load, power dissipation by the load is rendered independent of fluctuations in amplitude of the supply voltage. In order to maintain the RMS output voltage constant as peak amplitude of the supply voltage increases however, the average amplitude of output voltage supplied to the load is decreased by the circuit, although the circuit can be adjusted to maintain a constant average voltage across the load, if preferred.

2

Accordingly, one object of the invention is to provide a power control circuit for delivering constant RMS voltage of predetermined amplitude to a load from an AC power supply of RMS voltage amplitude exceeding the predetermined amplitude.

Another object is to provide a circuit which triggers at a predetermined time during each half cycle of an AC signal in order to supply a constant RMS voltage to a load.

Another object is to provide a circuit for producing an RMS output voltage of amplitude partially in accordance with amplitude of a predetermined constant DC voltage and partially in accordance with amplitude of the AC supply voltage.

Briefly, in accordance with a preferred embodiment of the invention, a power control circuit is provided for delivering substantially constant RMS voltage from an AC voltage source independent of the source voltage amplitude. The circuit comprises charge accumulator means, substantially constant voltage supply means coupled to the charge accumulator means, and means coupling the AC voltage source to the charge accumulator means. A load is provided together with switching means coupling the charge accumulator means to the load. The switching means are rendered conductive in each half cycle of the AC supply voltage only when the voltage amplitude across the charge accumulator means exceeds a predetermined level, transferring to the load at that time the charge stored by the charge accumulator means.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

The single figure is a schematic diagram of the power control circuit of the instant invention.

DESCRIPTION OF TYPICAL EMBODIMENTS

In the figure, a full-wave rectifier 10, shown as a rectifier bridge, is energized from a source of AC voltage 11 through an on-off switch 25. The output of rectifier bridge 10 is coupled to charge accumulator means, shown as a capacitor 12, through a resistance 13. The output of full-wave rectifier bridge 10 is also coupled to voltage limiting means, shown as the cathode of a Zener diode 14, through a resistance 15. The cathode of Zener diode 14 and one plate of capacitance 12 are connected through a resistance 16, while the anode of Zener diode 14 and the other plate of capacitance 12 are grounded. A capacitor 17, conveniently of the electrolytic type, is connected in parallel with Zener diode 14.

The emitter of a unijunction transistor 18 is connected to the junction of capacitance 12 and resistance 13. The output of full-wave rectifier bridge 10 is coupled to base B2 of unijunction transistor 18 through a resistance 20, which is preferably variable. Base B1 of unijunction transistor 18 is connected to ground through the primary winding of a transformer 21, while a pair of secondary windings 26 and 27 of transformer 21 control application of voltage across a load, illustrated as a resistance 22, by controlling the gate-to-cathode voltage of a pair of semiconductor controlled rectifiers (designated SCR's) 28 and 29 respectively connected in back-to-back parallel relation. The anode of SCR 28 and cathode of SCR 29 are connected to one side of load 22, the other side of which is grounded, while the cathode of SCR 28 and anode of SCR 29 are energized directly by the AC signal from switch 25.

Typically, load 22 comprises a lamp, or a plurality of parallel-connected lamps, since constant illumination therefrom requires energization from a source of constant effective or RMS voltage; however, load 22 is not necessarily a resistive load, but instead may be a load of any form requiring energization from a constant RMS voltage in order to operate properly. If desired, a small capacitor 23 may be connected (as shown dotted) from base B2 of transistor 18 to ground for the purpose of short-circuiting to ground any unwanted transient voltages which may appear at base B2 of transistor 18 due to the sharp discontinuities in voltage produced by contact bounce at the switch contacts of on-off switch 25 each time the switch is closed.

When switch 25 is closed, the circuit is energized so that full-wave rectifier 10 produces voltage waveforms as illustrated at its output as a result of receiving sinusoidal input voltages from AC source 11. The output voltage of full-wave rectifier 10 causes capacitor 12 to charge due to current flow through resistance 13. In addition, a voltage is applied across Zener diode 14 through resistance 15 from the full-wave rectifier. Zener diode 14 clips the peaks of the voltage waveform at a value that is determined primarily by the Zener diode, and is substantially independent of the output of full wave rectifier 10. Thus, capacitor 12 acquires an additional charge by virtue of the voltage drop across Zener diode 14, due to current flow through resistance 16. Accordingly, capacitor 12 is charged through a pair of summing resistances 13 and 16, with resistance 13 deriving current from the rectified AC source and resistance 16 deriving current from a constant voltage source. The clipped voltages appearing across Zener diode 14 are illustrated in the figure.

As capacitor 12 charges, the voltage thereacross builds to a level sufficiently high to forward bias the emitter of transistor 18. Capacitor 12 is thereupon discharged through the emitter-base B1 circuit of transistor 18, producing a voltage pulse on the primary winding of transformer 21. A voltage pulse is thus induced in the secondary windings of transformer 21 causing whichever of SCR's 28 and 29 is forward biased to conduct. Similarly, during the next half cycle of AC input voltage, another pulse is induced in the secondary windings of transformer 21, causing another pulse to appear across the load due to current flow through the other one of SCR's 28 and 29 which is forward biased.

It should be noted that transistor 18 becomes conductive through the emitter-base B1 circuit only near the end of each half cycle of output voltage from full-wave rectifier 10, since only near the end of each half cycle of voltage produced by the full-wave rectifier does the voltage on base B2 drop to an amplitude sufficiently low that the positive voltage on capacitor 12 forward biases the emitter electrode of the unijunction transistor. Capacitor 12 is thus discharged close to the end of each half cycle of AC voltage, producing a voltage pulse at this time across load 22. Accordingly, capacitor 12 serves the purposes of storing energy for discharge through output transformer 21, and of providing a phase shift.

The time at which unijunction transistor 18 fires is controlled by the interbase voltage, or voltage across bases B1 and B2 of the transistor, as well as the emitter-base B1 voltage. Thus, as the interbase voltage is increased, a higher emitter-base B1 voltage is required in order to render the transistor conductive through its emitter-base B1 circuit. Accordingly, a higher AC line voltage results in a higher interbase voltage, and more time is required for capacitor 12 to charge to a voltage amplitude sufficient to fire the transistor. This additional time is due to the fact that the capacitor not only is charged through resistance 13 which, under such circumstances, applies a higher voltage thereto, but the capacitor also is charged through resistance 16 at a voltage amplitude which remains constant regardless of line voltage amplitude. The transistor thus fires later in each half cycle of line voltage as line voltage is increased. Conversely, as line voltage is decreased, firing occurs earlier in each half cycle.

Power furnished to load 22 depends upon the time at which SCR's 28 and 29 fire in each half cycle of AC line voltage since the earlier they fire, the longer the time in the half cycle during which the load receives power, and vice versa. Accordingly, the RMS voltage which, for a constant value of load resistance, varies as the square root of power dissipated by the load, is held constant so that power dissipation by the load is held constant.

The average change in output voltage amplitude for any given change in input voltage amplitude can be controlled by adjusting the ratio of resistances 13 and 16, since the voltage on capacitor 12, and hence the output voltage, is more responsive to changes in input voltage when the ratio of resistance 13 to resistance 16 is low, and vice versa. Similarly, the point in each cycle of input voltage where the transistor fires can be varied by varying the size of either one of resistances 13 and 16; that is, a decrease in size of either resistance advances the firing point, while an increase retards this point. In order to keep the RMS output voltage constant, it is necessary that the average voltage drop off as peak voltage increases. Since changes in average output voltage due to changes in input voltage can be controlled in the aforementioned manner, it is a simple matter to adjust resistances 13 and 16 to obtain a constant RMS voltage instead of a constant average voltage.

Resistance 20 is preferably chosen to be a variable resistance in order to permit adjustment of output power without disturbing the relationship that results in producing a constant output voltage amplitude over a range of input voltages. Therefore, for any particular setting of resistance 20, at least over a large range of ohmic values, the output power remains essentially independent of the input power.

Another way that a linear relationship between output and input voltage waveforms may be obtained would be by impressing the output voltage of full-wave rectifier 10 on base B2 of unijunction transistor 18 and the constant voltage which appears across Zener diode 14 on the emitter of transistor 18, since the firing point of the transistor is a constant fraction of the interbase voltage. This would be accomplished by removing resistance 13 and adding a resistance connected from the output of full-wave rectifier bridge 10 to ground. However, the arrangement shown in the figure is preferable because it permits adjustment of output power without disturbing the relationship that results in producing a constant output voltage amplitude over a range of input voltages, as described previously.

Capacitor 17, connected in parallel with Zener diode 14, adds a "slideback" feature to the circuit by permitting a slow warm-up period so as to obviate any inrush current problem. Since the voltage across capacitor 17 is essentially constant, the capacitor does not in any way affect timing of the circuit. However, a predetermined interval extending over several cycles of input voltage is required in order to fully charge this capacitor, and during this interval the firing of transistor 18, which initially occurs very late in each half cycle, "slides back" so as to fire at an earlier point in each half cycle; hence the "slideback" feature. The net effect of this feature is that the circuit provides a slow build-up of output power during the aforementioned interval, beginning when switch 25 is closed.

Addition of capacitor 23 connected from base B2 of transistor 18 to ground is optional, as previously indicated, for the purpose of short-circuiting some of the transient voltages that arise when switch 25 is closed. However, capacitor 23 must not be very large since it is charged and discharged by the sinusoidal waveform produced by full-wave rectifier 10, thereby introducing a phase shift which, if excessively large, could upset the desired firing relationship and decrease the range of good output voltage control.

The foregoing describes a power control circuit for delivering constant RMS voltage of predetermined amplitude to a load from an AC power supply of RMS voltage amplitude exceeding the predetermined amplitude. The circuit triggers at a predetermined time during each half cycle of an AC signal in order to supply a constant RMS voltage to a load. The circuit produces an RMS output voltage of amplitude partially in accordance with amplitude of a predetermined constant DC voltage and partially in accordance with amplitude of the AC supply voltage.

What is claimed is:

1. A power control circuit for delivering substantially constant AC voltage to a load from an AC supply independent of voltage amplitude of said supply, said power control circuit comprising:
    a pair of controlled rectifiers connected in back-to-back parallel relation and in series with said AC supply and said load, each of said controlled rectifiers having an anode, a cathode and a gate electrode;
    a unijunction transistor having an emitter electrode and first and second base electrodes;
    a capacitor connected between the emitter electrode of said transistor and a ground reference;
    a transformer having a primary winding and two secondary windings, each secondary winding connected to one of said controlled rectifiers between the gate and cathode thereof and said primary winding connected between the first base electrode of said transistor and said ground potential;
    a Zener diode having a predetermined breakdown voltage;
    full wave rectifier means for converting said AC supply voltage to a pulsating DC voltage;
    a first resistor connected between said rectifier means and the cathode of said Zener diode;
    a second resistor connected between said rectifier means and the emitter of said transistor;
    a third resistor connected between said rectifier means and the second base of said transistor; and
    a fourth resistor connected between the cathode of said Zener diode and the emitter of said transistor;
    said capacitor being charged from a substantially constant voltage from said Zener diode through said fourth resistor and from the pulsating DC voltage through said second resistor whereupon the voltage on said capacitor builds to a level sufficiently high to forward bias said transistor to produce voltage pulses in said transformer to cause the forward biased controlled rectifier to conduct current from said source to said load.

2. The power control circuit of claim 1 including an additional capacitor connected in parallel with said Zener diode to provide a slow buildup of output power to said load.

3. The power control circuit of claim 2 including an additional capacitor connected between the second base of said transistor and said ground potential for reducing transient voltage signals.

References Cited

UNITED STATES PATENTS

| 3,252,010 | 5/1966 | Buttenhoff. |
| 3,304,487 | 2/1967 | McCaskey. |
| 3,321,641 | 5/1967 | Howell _____ 307—352 |
| 3,363,163 | 1/1968 | Nord et al. |
| 3,440,517 | 4/1969 | Page et al. |

J. D. MILLER, Primary Examiner

A. D. PELLINEN, Assistant Examiner

U.S. Cl. X.R.

323—24, 36